Figure 1:
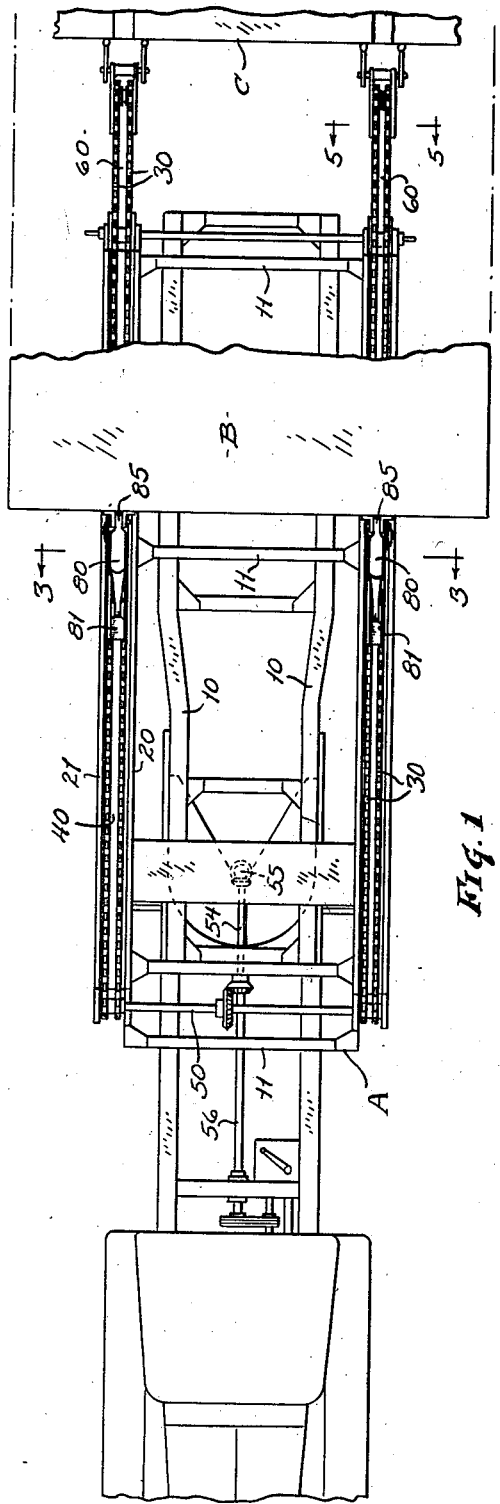

May 4, 1943.    B. F. FITCH    2,317,984
APPARATUS FOR TRANSFERRING FREIGHT
Filed March 12, 1940    2 Sheets-Sheet 1

INVENTOR.
Benjamin F. Fitch,
BY Balis, Tears & McBean
ATTORNEYS.

May 4, 1943.  B. F. FITCH  2,317,984
APPARATUS FOR TRANSFERRING FREIGHT
Filed March 12, 1940  2 Sheets-Sheet 2

INVENTOR.
Benjamin F. Fitch
BY Bates, Teare & McBean
ATTORNEYS.

Patented May 4, 1943

2,317,984

UNITED STATES PATENT OFFICE 2,317,984

APPARATUS FOR TRANSFERRING FREIGHT

Benjamin F. Fitch, Greenwich, Conn., assignor, by mesne assignments, to National Fitch Corporation, New York, N. Y., a corporation of Delware Application March 12, 1940, Serial No. 323,557

8 Claims. (Cl. 214—83)

This invention relates to an apparatus for transferring demountable freight containers between vehicles, and more particularly from a highway truck to a railway car or shippers platform, or vice versa.

The invention is concerned especially with a propelling chain on one of the vehicles which may directly engage the container when over the chain to move the container with reference to such vehicle, or may be connected with the container through the intermediacy of a push-and-pull bar, whereby the chain may move the container when it is not directly over the chain.

In the present embodiment, my invention comprises a highway truck equipped with an endless propelling chain operating in a vertical plane, the chain being provided with periodic projections which extend in such direction that they project upwardly from the upper reach of the chain, which upper reach is effectively supported substantially throughout its length. The demountable body is adapted to rest on such upward projections. A push-and-pull bar is adapted to be attached at one end to projections on the chain, and at the other end to the body. Thus when the body is standing on the car it may be pulled therefrom by the chain acting through the push-and-pull bar extending across the space between the vehicles. Later in the transferring operation, after the body stands over the propelling chain, the push-and-pull bar may be removed and the chain itself by direct engagement with the container move it to final position. Similarly, when the body is to be removed from the truck the direct engagement of the chain may move it far enough for the push-and-pull bar to be attached.

Another feature of the invention comprises providing the chains with rollers on the pivot pins of the links, which rollers ride on a rigid supporting guide on the truck, the projections on the chain not only engaging the demountable container but supporting it, so that the container is in effect mounted on the truck by intermediate rollers which are controlled by the chain. This provision materially reduces the friction between the container and the truck as it is shifted thereon.

In this feature of arranging the chain as a roller support for the container, the present invention is an improvement on that shown in my prior Patent No. 2,127,481, where the chain did not actually support the container, and operated it only through the push-and-pull bar. For the broad feature of the alternatively shifting of the container by direct engagement of the chain or by push-and-pull bar engagement, reference is made to my pending application Serial No. 301,-920, filed October 30, 1939. That application discloses and claims the alternative direct and push-and-pull bar engagement of the container by the chain, but in that application the chain does not provide the support for the container, as herein shown and claimed.

The invention is illustrated in the drawings hereof, and is hereinafter more fully described and the novel features are summarized in the claims.

Figure 2:
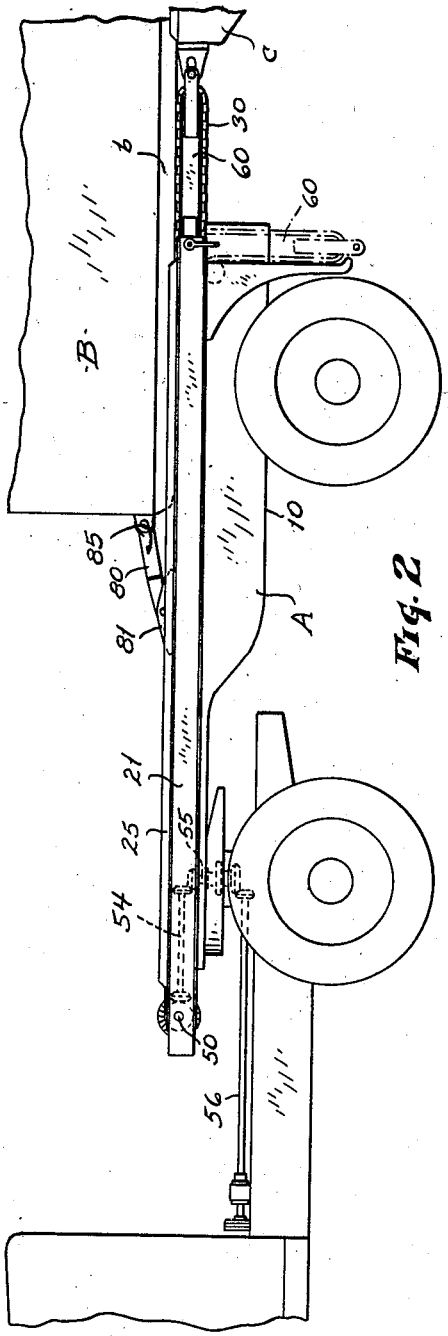
Figure 3:
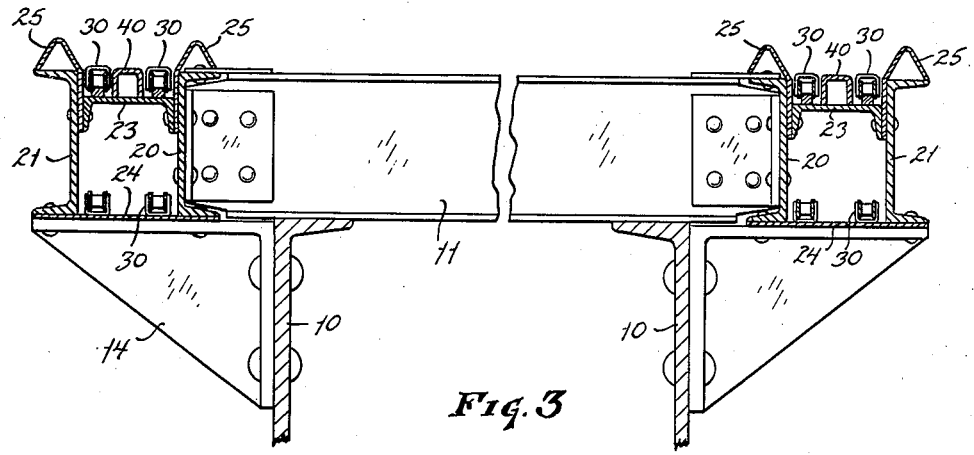
Figure 4:
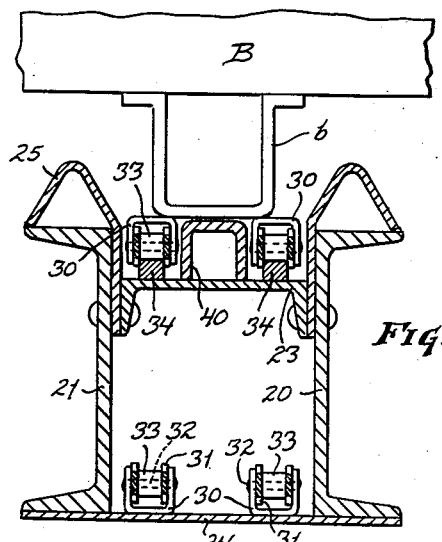
Figure 5:
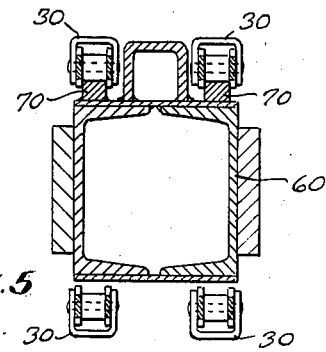
Figure 6:
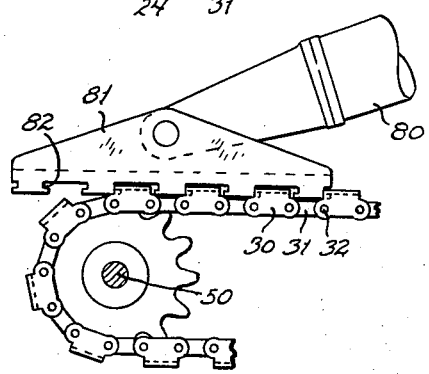
Figure 7:
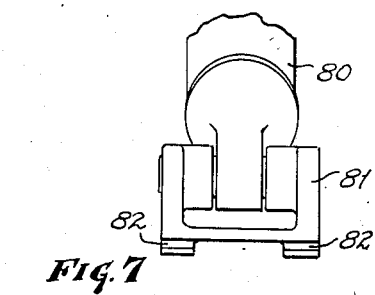

In the drawings, Fig. 1 is a plan illustrating my invention embodied in an automotive vehicle in a position adjacent a railway car or platform, a container being propelled from the car or platform onto the truck; Fig. 2 is a fragmentary side elevation of a highway truck having my propelling chain; Fig. 3 is a transverse section through the truck, as indicated by the lines 3—3 on Fig. 1; Fig. 4 is a transverse section on a larger scale through the propelling chain and support at one side of the truck, this view showing the body supported by the chain over the truck guideway; Fig. 5 is a cross-section through one of the pivotally mounted bridges which may connect the truck with the railway car, and support the container between them; Fig. 6 is an enlarged fragmentary detail of the push-and-pull bar connected with the propelling chain; Fig. 7 is an end view of the push-and-pull bar and a shoe thereon which connects with the chain.

In Fig. 1 of the drawings, A represents a highway truck shown as comprising a tractor and trailer; B a demountable body adapted to contain freight; C a railway car which may support the body. As illustrated, the body is mounted transversely on the car, and is adapted to stand lengthwise on the truck which is backed up into position to stand at right angles to the car. If desired, however, the transfer mechanism may be arranged to extend transversely of the truck, in which case the latter will be placed parallel with the car, so that a body mounted lengthwise of the car may be transferred into similar position on the truck. In either case the truck is equipped with endless propelling chains which are adapted to shift the body as about to be explained.

As shown in Figs. 1 and 2, the trailer frame comprises longitudinal sill members 10 which carry transverse members 11 projecting laterally beyond them. Secured to the sides of the longitudinal sill member are brackets 14. These brackets carry the chain supports which comprise upright longitudinal beams 20 and 21 in the form of channels placed back to back, and horizontal beams 23 between the channels, and a tie plate 24 at the bottom thereof. The inner channel beam 20 is also attached to the transverse beams 11, as shown in Fig. 3 to make a rigid construction.

Secured to the longitudinal beams 20 and 21 are upwardly extending, outwardly inclined sheet metal members 25 which are bent over outwardly to provide lateral guides for the body, being adapted to receive between them the rails $b$ on the underside of the body.

The frame construction above described carries chains on opposite sides of the body. I have illustrated two chains at each side. Each chain is an endless member composed of links 30 connected by intermediate links 31, the links being pivoted by pins 32. On these pivots are rollers 33. At the upper reach of the chain, these rollers ride on bars 34 secured to and supported by the horizontal beam 23.

The links 30 of the chain are U-shaped members transversely so that they extend down on the outer sides of the connecting links 31 and have their intermediate portions above those links at the upper reach of the chain and below the links on the lower reach. Thus, as shown in Fig. 4, the upper reach of the chain rides on the rollers carried by the chain while the lower reach rides on the U-shaped members supported on the transverse plate 24. Between the chains I place a distance bar 40, shown as of inverted U-shape in cross-section.

As shown in Fig. 4, the projections 30 of the chain stand higher than the separating bar 40, and the rail on the base of the container is wide enough to span the distance between the two chains. Accordingly, that portion of the container when over the truck is supported by one chain or the other, or both. I have shown it in Fig. 4 as supported by the two chains but a lateral shifting might bring the rail $b$ entirely onto one chain or the other. In any case, the container weight in this region is transferred by its rail $b$ to the U-shaped projections of the chain and thence through the rollers of the chain to the supporting bars 34, and the frame.

Any suitable means are employed to propel the chains. I have shown the chains mounted at the front and rear ends on sprockets, the front sprocket being on a cross-shaft 50, carrying a bevel gear meshing with a bevel pinion on a longitudinal shaft 54. The latter shaft is shown as connected by bevel gearing to an upright shaft 55 at the king pin connecting the trailer with the tractor, the upright shaft being bevel geared to a shaft 56 on the tractor. This shaft may be driven by the motive power of the tractor.

In place of the mechanical driving connection above described, I may provide a motor on the trailer which is connected through reduction gearing directly to the chains. This motor may be actuated by current supplied from a generator mounted on the tractor and driven by the motive power thereof, as shown in my prior Patent No. 2,127,482.

Pivoted bridges 60 at the ends of the trailer are adapted for attachment at their free ends to the car side, as shown in Figs. 1 and 2. These bridges are shown as carrying the propelling chains, the same passing around sprockets at the far ends of the bridge. The rollers of the chain rest on supporting bars 70 (Fig. 5) on the bridges, and thus provide a support of reduced friction for the container.

When it is desired to move the container from the car to the trailer, the push-and-pull bars 80 are attached at one end to the side of the container near the bottom, as shown at 85 in Figs. 1 and 2, and the shoe on the other end of the push-and-pull bar is placed in engagement with projections 30 on the chains. Now when power is supplied to the chains in a direction to move the upper reaches away from the car, the chain projections come into the notches 82 on the underside of the push bar shoe 81 (see Fig. 6) lock the chain thereto, whereupon continued movement of the chain pulls the container first across the bridges and then on to the trailer.

It will be noticed that the diameter of the chain rollers 33 is less than the height of the chain links at the pivots, so that the links project below the rollers, and the bars 34 on which the rollers ride accordingly stand between the lowermost portion of the links, as shown in Fig. 4, and form guides for the chains as they travel.

As the container comes over the trailer it is supported by the rollers on the chain resting on the supporting bars 34. As the chain advances, the container rolls into position over the truck. Near the far end of the movement as the chain passes over the forward sprocket the shoe automatically disengages itself, as illustrated in Fig. 6, and thereafter the movement of the supporting chains carries the container directly without the aid of the push-and-pull bars into the final position desired. When it arrives at such final position, the power is shut off and the container remains in this position, retained by the chains.

When it is desired to shift the container from the trailer to the car, the chains are operated to move their upper reaches toward the car, thus carrying the body first to a position where the push-and-pull bars can be readily attached to the body and chains, then the continued movement of the chains shoves the body onto the car, the push-and-pull bars bridging the distance between the trailer and car.

I claim:

1. A freight transporting vehicle, endless propelling chains thereon carrying rollers, means extending lengthwise of each chain beneath an upper reach thereof engaged by the rollers for supporting the chain, a container adapted to be supported by such upper reaches of the chains and moved substantially horizontally by the movement of the chains, and means adapted for attachment to the chain and to the container for moving the container in either direction when it is not over the chain.

2. In a vehicle, the combination with the frame of the vehicle of a pair of endless chains each mounted in a vertical plane, each chain carrying a series of rollers, a support beneath the upper reach of each chain on which the rollers may rest, means for so guiding a container that it will rest on the chains and thus be supported by rollers riding on said support, and a push-and-pull bar adapted to connect the container with the chains.

3. The combination of a vehicle, endless chains thereon each traveling in a vertical plane, a support beneath each chain and extending lengthwise of the upper reach of the chain, each chain having rollers at its pivots adapted to coact with the support, said chain having projections which extend in a direction which is upwardly from the upper reach of the chain, a container adapted to rest on said projections and be supported by the chains, and a push-and-pull bar adapted to be attached to the container and to the chains, whereby the chains may move the container when the container is not resting on the chains.

4. The combination of a vehicle, endless chains mounted thereon each located in a vertical plane, periodic projections carreid by each chain extending in a direction which is upwardly from the upper reach of such chain, a container adapted to rest on said projections and be supported thereby, means for moving the chains, and a push-and-pull bar adapted to be attached at one end to the container and having at its other end a shoe with downwardly facing recesses to receive some of the upwardly extending projections on the chains.

5. The combination of a highway vehicle having endless chains each operating in a vertical plane, a support extending lengthwise of each chain beneath the upper reach thereof, the chain having side links connected by pins carrying rollers which travel on said support, certain links of the chain having upward projections in the form of U-shaped members bridging across the chain, a container having a rail on its base, means on the vehicle for guiding said rail so that it must stand over the upper reach of either chain whereby the chains support the container out of contact with the rollers, a push-and-pull bar adapted to be connected with the container, said push-and-pull bar having a shoe with downward recesses adapted to coact with certain said projections, whereby the chains may be attached to the container to pull it or shove it at a time when the chains are not supporting the container.

6. The combination of a highway vehicle, a pair of parallel guiding channels thereon, said channels being open upwardly, chains at the base of the channels having rollers riding on longitudinal supports, said chains carrying projections extending upwardly above any other member in the channel base, means for moving such chains, a container having on its base a pair of parallel skid rails narrower than the channel but guided by the side walls of the channel so that they must rest on the chains when they are in the channel, and push-and-pull bars adapted to connect said chains with the container whereby the container may be moved by direct engagement of the chains when directly over the chains and push-and-pull bar connection when not directly over the chains.

7. The combination of a vehicle, endless chains mounted thereon each operating in a vertical plane, periodic projections carried by each chain extending in a direction which is upwardly from the upper reach of such chain, rollers on said chains, a bar extending lengthwise of said upper reaches on which the rollers track, a container adapted to rest on said projections and be supported by the bars through the intermediacy of the chain and be transported by movement of the chains, and push-and-pull bars adapted to be attached at one end to the container and at the other end to the chains.

8. The combination of a vehicle having two pairs of endless chains, the members of each pair operating in adjacent vertical planes, supports extending lengthwise of the chains beneath the upper reaches thereof, a separator between the two upper reaches of the chains in each pair and lower than the tops of the chains, a container having a pair of rails on its base, each rail being wider than the space between said chains of a pair, means on the vehicle for guiding said rails so that they must stand over the upper reach of at least one of the chains of the respective pairs, whereby the chains support the container and move it, and a pair of push-and-pull bars adapted to connect the upper reaches of the chains of both pairs with the container whereby the container may be moved by the chains while not supported thereby.

BENJAMIN F. FITCH